United States Patent [19]
Adams

[11] 3,876,457

[45] Apr. 8, 1975

[54] ADHESIVE-COATED FABRIC OR CORD

[75] Inventor: Hansford Tyson Adams, Leesville, S.C.

[73] Assignee: Uniroyal, Inc., New York, N.Y.

[22] Filed: Aug. 2, 1973

[21] Appl. No.: 385,200

[52] U.S. Cl. ........... 117/138.8 N; 117/72; 117/76 T; 117/90; 117/92; 117/93.31; 117/138.8 F; 117/145; 156/335; 260/29.3
[51] Int. Cl. ...................... B32b 25/10; B32b 27/36
[58] Field of Search ....... 156/335; 117/90, 72, 76 T, 117/138.8 F, 138.8 N, 145; 260/29.3

[56] References Cited
UNITED STATES PATENTS

| | | | |
|---|---|---|---|
| 3,135,624 | 6/1964 | Nakane et al. | 156/335 X |
| 3,443,986 | 5/1969 | Watanabe et al. | 156/335 X |
| 3,549,481 | 12/1970 | Cesare et al. | 156/335 X |
| 3,775,150 | 11/1973 | McClary | 117/90 X |

*Primary Examiner*—Ralph Husack
*Attorney, Agent, or Firm*—Willard R. Sprowls, Esq.

[57] ABSTRACT

Adhesive-coated tire cord fabric and similar fabric and single end cords for other end uses can be protected from the adverse effects of atmospheric pollutants, prior to the adhesion of such fabrics to rubber, by incorporating N,N'-ethylene bis-stearamide in the adhesive formulation.

4 Claims, No Drawings

ADHESIVE-COATED FABRIC OR CORD

This invention relates to the protection of adhesive-coated tire cord, other fabrics, and single end cords, which are subsequently, after storage and/or shipment, to be adhered to rubber layers, from the adverse effects of atmospheric pollutants. It has been found that such fabrics and cords, after exposure to high levels of atmospheric pollutants present at normal to high temperatures and with a high incidence of UV light, demonstrate little or no adhesion to rubber layers in the construction of tires and other end products.

A patent to Watanabe et al., U.S. Pat. No. 3,443,986, proposes the inclusion of certain waxes in adhesion formulations to improve the adhesive strength of fibrous materials coated therewith. However, the formulations of this patent do not provide the answer to the problem encountered by the applicant.

Conventional adhesive dip formulations for application to fabric made from polyamide, polyester or rayon cord, which is subsequently to be adhered to shaped rubber articles prior to the vulcanization thereof, comprise a dip of a resorcinol-formaldehyde condensate and a latex of a vinyl pyridine-butadiene-styrene terpolymer or of a butadiene-styrene copolymer. It has been found that the effects of atmospheric pollutants, as referred to above, can be overcome by the incorporation of from about 1 to about 10 weight percent, based on the dry rubber solids content of the dip, of N,N'-ethylene bis-stearamide. This bis-stearamide is a waxy material having a melting point of 288° to 293°F.

This invention will be described primarily in terms of the preparation of polyamide, polyester or rayon tire cord fabric for incorporation into shaped rubber tire carcasses with good adhesion. The following examples are given to demonstrate the application of the invention. It is understood that the invention is equally applicable to adhesive-coated fabric and single end cords intended for other uses.

EXAMPLE 1

This example illustrates the application of the novel additive of the present invention to protect polyester tire cord from the adverse effects of atmospheric pollutants, prior to adhesion of such fabrics to rubber.

Twisted 3440 denier, polyester (polyethylene terephthalate) tire cord consisting of 3 ply cord (in which each ply has 9.2 'Z' turns in the singles and 9.2 'S' turns in the plying operation) is run through a first dip having the following composition described in U.S. Pat. No. 3,307,966.

Composition — Dip One 1. 22.0g phenol blocked MDI (Hylene MP - DuPont)
2. 1.5g Aerosol O.T. (dioctyl sodium sulfosuccinate)
3. 9.0g Epon 812 (an epoxide)
4. 1200g Water The total solids on the cord after this first dip treatment is 0.5–1.5% (dry weight based upon the weight of the cord).

The cord is then cured for 40 seconds at 445°F while applying 2.0% stretch. The cord is then run through a second dip (RFL dip) having the following composition:

Composition — Dip Two 1. 100g Vinyl pyridine latex (40% solids consisting of 70% butadiene — 15% vinylpyridine — 15% styrene terpolymer (Pyratex)
2. 2.5g Ammonium hydroxide
3. 9.0g Resorcinol-formaldehyde condensation product (Kopper's "Penacolite 2170")
4. 4.5g Formalin (37%) diluted with water to 20% solids
5. N,N'-Ethylene-bis-stearamide — 5 parts wax solids to 100 parts dry rubber solids.

Modified resorcinol-formaldehyde condensation products can also be substituted, e.g., those in which another dihydric phenol is used or in which a third reactive component is included.

In general, the additive of this invention was made into a slurry by mixing various proportions of the additive and water with the appropriate dispersing system. The amount of additive used and found to be effective amounts to about 1 to 10 weight percent, based on the dried rubber.

The cord is then dried and cured at 390°F for 90 seconds. The percent solids of RFL picked up on the cord is 2.5 to 4.5% dry weight based upon the weight of the cord. Adhesion results are obtained using the following test method which is also described in U.S. Pat. No. 3,549,481, the contents of which are hereby incorporated by reference herein.

A desirable procedure for storing and shipping the rolls of adhesive dipped tire cord fabric is to wrap each one in a polyethylene bag, draw a vacuum on the bag and tape the previously open end of the bag. Additional packing may be desirable prior to shipment but, with this treatment, there is no problem concerning atmospheric pollutants and U.V. light. It is only after the roll of tire cord fabric is withdrawn from the polyethylene bag in a badly polluted atmosphere that the problem solved by this invention is encountered.

The atmospheric pollutants which cause the most trouble for fabric adhesive coatings are the oxides of nitrogen and ozone. These are particularly detrimental in the presence of high temperature, low humidity and exposure to light, the ultraviolet rays being most damaging. Consequently, for testing purposes, a six foot by six foot room was equipped with apparatus necessary to provide the following conditions:

| | |
|---|---|
| Temperature | 100°F + |
| Relative Humidity | 20% |
| Ozone Concentration | 10 to 25 parts/hundred million |
| Nitrogen Dioxide | 8 to 15 parts/hundred million |
| Total Light | 100 foot candles |
| Ultraviolet and Infrared Light | 160 Microwatts/cm$^2$ |

Using this laboratory accelerated testing procedure, the use of the additive of this invention increases the resistance to adhesion loss by at least a factor of three in time. This is of vital importance since the fabric must retain good adhesion throughout all operations in conversion into a tire, a conveyor belt, etc. In general, those samples which retain an adhesion appearance of 4.0 or greater after one hour in this test have been found to process without problems under factory conditions.

Treated polyester cords are placed in parallel arrangement with 24 ends to the inch. Two pieces of 3 inch × 4 inch backing stock (a rubber material having a light weight reinforcing fabric in it) are pressed onto the cords by hand with the cord running parallel to the 3 inch side. The two pieces of backing stock are placed so that they cover different portions of the cords and are approximately one inch apart. The cord is then trimmed even around the edges of the backing stock. The cord side of the backing stock is then pressed by hand onto an adhesion stock. A typical formulation would be a 35/45/20 blend of natural rubber, styrene-butadiene rubber and cis-butadiene rubber tire skim stock containing 50 parts of carbon black, 1.5 parts of stearic acid, 25 parts of reclaimed rubber, 10 parts of zinc oxide, 1 part of antioxidant, 5 parts of pine tar, 1 part of mercaptobenzothiazole, 0.1 part of diphenylguanidine and 3.2 parts of sulfur. Care is taken not to touch the cord or the adhesion surface of the backing stock or the adhesion stock. The articles formed are trimmed and cut in half. A 1 inch × 4 inch aluminum foil or Holland Cloth separator is placed on the exposed surface of the adhesion stock on one of the specimen halves, with the separator being aligned along one 4 inch edge. The specimen halves are laminated together so that adhesion stock contacts adhesion stock except in the area where the separator is present.

The assembly is placed in a press and cured for 6 minutes at 350°F platen temperature and 200 psi pressure.

The resultant article is cut into four 1 inch × 3 inch strips and the two end strips are discarded.

The separator is removed from the end of the remaining middle strips, the two end portions (referred to as tabs) are spread apart and maintained in that condition and the strips are placed in an Instron oven at 250°F for 30 minutes. Subsequently the tabs of each article are placed in the jaws of an Instron Tester, and the jaws of the tester are separated at a rate of 5 inches per minute and a chart speed of 1.5 inches per minute. Sufficient force in the tester is obtained to separate the article along its length. The separated surfaces are then examined to see how much of the cord has become visible due to stripping of the rubber from the cord. This is recorded according to the following scale:

| Rating | | |
|---|---|---|
| 5 | 100% Rubber Failure | No Cord Visible |
| 4 | 75% Rubber Failure | 25% Cord Visible |
| 3 | 50% Rubber Failure | 50% Cord Visible |
| 2 | 25% Rubber Failure | 75% Cord Visible |
| 1 | No Rubber Failure | 100% Cord Visible |

Thus, the highest rating value of the scale indicates that the adhesion bond was so strong that the failure occurred in the rubber stock; the lowest value of the scale indicates a weak adhesion bond, failure having occurred at the interface of the rubber stock and the cord rather than in the rubber stock itself.

Table I summarizes the comparison of exposure resistance using the described conditions of the polyethylene terephthalate tire cord with and without additive, N,N'-ethylene-bis-stearamide.

Table I

| | Appearance/Lbs. Pull | | |
|---|---|---|---|
| | 0 Mins.* | 60 Mins.* | 180 Mins.* |
| No Additive | 5.0/35 | 4.0/30.0 | 1.5/28.5 |
| 5 Parts Additive | 5.0/36.6 | 5.0/38.0 | 5.0/41.0 |
| 7½ Parts Additive | 5.0/32.5 | 5.0/37.0 | 5.0/37.5 |
| 10 Parts Additive | 5.0/32.5 | 5.0/34.5 | 5.0/35.5 |

Note: Amounts of additives are based on dry rubber solids.
*Minutes of exposure at 10 PPHM Ozone and 10 PPHM Oxides of nitrogen.

Example 2

This example illustrates the application of the additive of the present invention in a single dip system to protect polyester tire cord from the adverse effects of atmospheric pollutants.

A twisted 3 ply, 3440 denier, polyester tire cord as described in Example 1 is run through a single dip system (H-7) described by ICI literature and in the British Polymer Journal [Vol. 3, p. 58 (1971)]. Briefly this dip system consists of an RFL (similar to that described in Example 1) with a special resin additive prepared from p-chlorophenol, resorcinol and formaldehyde. The cord is treated as described in Example 1 with the exception that 460°F is required in the first oven instead of 445°F. Normally a dry weight ratio of 20g special resin to 40g RFL portion is employed.

Total solids on the cord is 4.5–5%.

Table II

| | | Appearance/Lbs. Pull | |
|---|---|---|---|
| | Ozone PPHM | 0 Mins. | 60 Mins. |
| Without additive | 10 | 4.9/29.0 | 3.0/26.0 |
| With additive* | 10 | 4.9/30.5 | 4.5/29.5 |

*10 parts by weight based on 100 parts dry rubber solids (Latex).

Example 3

This example illustrates the application of the additive of the present invention to protect polyamide tire cord from adverse effect of atmospheric pollutants.

Twisted 2520 denier polyamide (nylon 6,6) tire cord consisting of 2 ply cord is passed through an oven at 445°F for a period of 40 seconds while applying 2.0% stretch. The cord is then run through a dip of the composition as Dip II (RFL) in Example 1. The cord is then processed as described in the remainder of Example 1.

Table III

Nylon 6,6 with N,N'-Ethylene-Bis-Stearamide

| | Appearance/Lbs. Pull | | |
|---|---|---|---|
| | 0 Mins.* | 15 Mins.* | 30 Mins.* |
| No Additive | 4.9/34.5 | 1.5/38.0 | 1.0/18.0 |
| 1 Part Additive | 4.9/35.0 | 4.0/36.0 | 4.0/34.0 |
| 5 Parts Additive | 4.8/39.5 | 4.7/38.5 | 4.5/31.5 |
| 10 Parts Additive | 4.8/34.5 | 4.7/37.5 | 4.5/29.5 |

Note: Amounts of additives are based on dry rubber solids (Latex)
*Exposure 10 PPHM ozone, 10 PPHM oxides of nitrogen.

Example 4

Fiber B is an aromatic polyamide (condensation polymer of p-phenylenediamine and terephthalic acid) developed by DuPont. Twisted 4570 denier Fiber B (1500/ 3 ply) tire cord is treated similarly to polyethylene terephthalate described in Example 1.

Table IV

| | Appearance/Lbs. Pull | |
|---|---|---|
| | 0 Mins.* | 120 Mins.* |
| Without Additive | 5.0/35.0 | 1.5/20.0 |
| With Additive** | 5.0/34.0 | 4.9/34.0 |

*Exposure 10 PPHM ozone, 10 PPHM oxides of nitrogen.
**10 parts/100 parts dry rubber.

Example 5

This example illustrates the use of the additive of the present invention with rayon tire cord. This 3300 denier cord is processed the same as that described for nylon 6,6 in Example 3 or with styrene-butadiene rubbery copolymer (40% solids) substituted for the vinyl pyridine terpolymer.

Table V

|  | Appearance/Lbs. Pull | | | |
|---|---|---|---|---|
|  | 0 Min.* | 30 Mins.* | 60 Mins.* | 180 Mins.* |
| Without Additive | 5.0/33 | 3.5/18 | 1.0/15 | 1.0/12 |
| With Additive** (in Vinyl pyridine System) | 5.0/33 | — | — | 4.9/35 |
| Without Additive with SBR | 5.0/33 | 4.7/35 | — | 3.0/29 |
| With Additive** with SBR | 5.0/35 | 5.0/33 | — | 4.9/34 |

*Exposure 10 PPHM ozone, 10 PPHM oxides of nitrogen.
**10 parts additive/100 parts dry rubber.

The foregoing examples establish the excellent results which are obtained by the use of the additive of this invention.

Example 6

Cetyl stearate has been set forth as a desirable additive in U.S. Pat. No. 3,443,986. This additive was compared to N,N'-ethylene-bis-stearamide at 10 PPHM ozone with polyester cord. The results summarized in Table VI reveal the unsatisfactory nature of cetyl stearate as an adhesive additive for the purposes of this invention.

Table VI

|  | Initial Adhesion | | 30 Mins. Exposure* | | 1 Hour Exposure* | |
|---|---|---|---|---|---|---|
|  | App. | Lbs. Pull | App. | Lbs. Pull | App. | Lbs. Pull |
| No additive | 5.0 | 33.5 | 4.0 | 28.5 | 1.5 | 25.0 |
| 5% N,N'-ethylene-bis-stearamide** | 5.0 | 32.5 | 5.0 | 34.0 | 5.0 | 37.0 |
| 5% cetyl stearate*** | 5.0 | 33.0 | 1.2 | 23.5 | 1.0 | 26.5 |
| 10% cetyl stearate*** | 5.0 | 33.0 | 1.0 | 25.5 | 1.0 | 25.5 |

*Exposure 10 PPHM ozone, 10 PPHM oxides of nitrogen.
**Based on dry rubber content of rubber latex.
***Dispersion in water.

Example 7

Table VII presents a list of materials which were unsatisfactory for the purposes of this invention with polyester cord under the conditions described in Example 1. Most of the materials were tried at 2, 4, 6, 8 and 10 percent levels based on dry rubber solids (latex); the coated cords were tested in the exposure test described in Example 1 at 25 PPHM ozone.

Table VII

| Identification | Remarks |
|---|---|
| 1. N,N'-bis(1,4-dimethylphenyl)-p-phenylenediamine (Eastman Eastozone 33) | No resistance to exposure (1.0 appearance after 30 minutes exposure) |
| 2. N-phenyl-N'-cyclohexyl-p-phenylenediamine (Uniroyal Flexzone 6H) | " |
| 3. N-phenyl-N'-(1,3-dimethylbutyl)-p-phenylenediamine (Uniroyal Flexzone 7L) | " |

Table VII—Continued

| | |
|---|---|
| 4. Royalac 136 (proprietary accelerator like a dithiocarbamate) | " |
| 5. Butyraldehyde-aniline condensation product (Uniroyal Beutene, DuPont Antox) | " |
| 6. p-Chlorophenol-formaldehyde-resorcinol prepolymer (ICI's Pexul) | " |
| 7. Triallylcyanurate-formaldehyde-resorcinol prepolymer (ICI's N-3) | " |
| 8. Phenyl-B-naphthylamine (DuPont Neozone D + D Special) | " |
| 9. Phenyl-α-naphthylamine (DuPont Neozone A) | " |
| 10. 2,4-dihydroxy benzophenone (DuPont Rylex H) | " |
| 11. 4-dodecyloxy-2-hydroxy benzophenone (DuPont Rylex D) | " |
| 12. Diaryl phenylenediamines (DuPont Akroflex DAZ, Uniroyal JZF) | " |
| 13. Dialkylthioureas (Pennzone 685) | " |
| 14. Methyl 1-(butylcarbamoyl) 2-benzimidazole carbamate (DuPont Benlate) | " |
| 15. Nickel dibutyl dithiocarbamate (DuPont NBC) | " |
| 16. Diphenyl propylenediamine (C. P. Hall Hallcolite L) | " |
| 17. 6-Ethoxy-1,2-dihydro-2,2,4-trimethyl quinoline (Monsanto Santoflex AW) | " |
| 18. N,N'-bis(1,4-dimethyl pentyl)-p-phenylenediamine | " |
| 19. Sodium diethyl dithiocarbamate | " |
| 20. Dibutyl tin bis dibutyl dithiocarbamate | " |
| 21. Elemental sulfur | " |

The next set of waxes (22–33) are generally C18-C30 based mixtures with high hydrocarbon content which were previously advanced as additives in U.S. Pat. No. 3,443,986.

| | | |
|---|---|---|
| 22. | ESSO Household Paraffin Wax | No resistance to exposure |
| 23. | Nopco Corax Wax (paraffin wax) | " |
| 24. | Histowax (paraffin wax) | " |
| 25. | Baker Castorwax (glyceryl tri(12-hydroxystearate)) | " |
| 26. | Baker Dispersion 33 (dispersion of Baker Castorwax) | " |
| 27. | Socony-Mobil Mobilsir (paraffin wax) | " |
| 28. | Cincinnati Milacron Advawax 440 (bis-amide polymer) | Incompatible with Adhesive dip |
| 29. | Acrawax (amide derived from fatty acid) | Incompatible with Adhesive dip |
| 30. | Acrowax B (amide derived from tri-glyceride) | " |
| 31. | Acrawax HM (amide) | " |
| 32. | Glyconol (isopropyl bis-stearamide) | " |
| 33. | Glycolube VL (ethylene bis-oleamide) | " |

In general, the final weight of adhesive coating solids on the fabrics of this invention is on the order of 3-10 weight percent, the amount of the additive of this invention, based on the fabric weight, being on the order of 1.0 weight percent, although this amount can range as low as 0.1 weight percent.

A valuable method of providing protection from atmospheric pollutants for adhesive-coated tire cord and other fabrics has been presented in the foregoing description and is covered by the following claims.

Having thus described my invention, what I claim and desire to protect by letters patent is:

1. A fabric or single end cord made from a polyamide, polyester, or rayon cord and coated with 3 to 10 weight percent, based on the fabric weight, of a dried adhesive comprising: (1) a resorcinol-formaldehyde condensate and (2) a vinyl pyridine-butadiene-styrene rubbery terpolymer or butadiene-styrene rubber copolymer composition, and (3) N,N'-ethylene bis-stearamide, said coated fabric or single end cord having the characteristic of better retention of adhesion after exposure to atmospheric pollutants and U.V. light.

2. The product of claim 1 wherein the polyamide fabric or cord is nylon 6,6.

3. The product of claim 1 wherein the polyamide fabric or cord is Fiber B.

4. The product of claim 1 wherein the polyester fabric or cord is polyethylene terephthalate.

* * * * *